April 14, 1925.

R. C. SPRATLING 1,533,574

POULTRY RAISING APPARATUS

Filed Jan. 2, 1923    2 Sheets-Sheet 1

Inventor
R. C. Spratling
By C.A.Snow&Co.
Attorneys

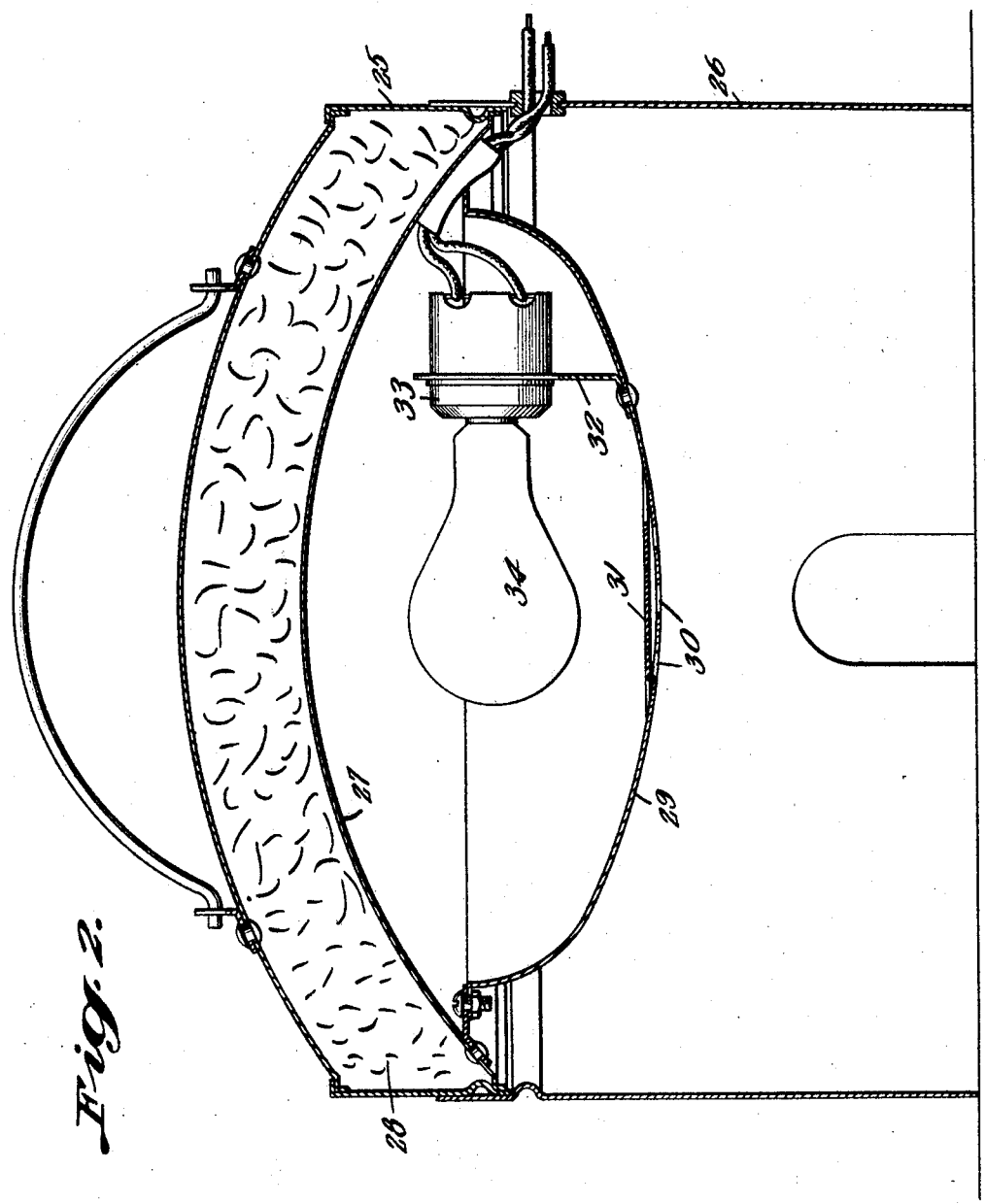

Patented Apr. 14, 1925.

1,533,574

UNITED STATES PATENT OFFICE.

ROPER C. SPRATLING, OF OPELIKA, ALABAMA.

POULTRY-RAISING APPARATUS.

Application filed January 2, 1923. Serial No. 610,353.

*To all whom it may concern:*

Be it known that I, ROPER C. SPRATLING, a citizen of the United States, residing at Opelika, in the county of Lee and State of Alabama, have invented a new and useful Poultry-Raising Apparatus, of which the following is a specification.

This invention relates to apparatus for use in raising poultry and more especially to means whereby incubators and brooders can be heated efficiently by radiation, it being designed to utilize thermostatically controlled heating lamps housed within the structure of the apparatus, means being provided for reflecting against a cover sheet the rays which do not pass directly to said sheet from the lamp.

Another object is to provide a structure utilizing a cover sheet or unit for transmitting heat to the eggs or chicks in the structure, whereby approximately the same results are obtained as where they are heated by the body of a hen.

A further object is to provide a structure of this character with novel means for ventilating the same without allowing cool fresh air to come into direct contact with the contents being treated.

A still further object is to provide a structure of this character utilizing a humidity supplying means of novel form.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit of the invention as claimed.

In the accompanying drawings the preferred form of the invention has been shown.

In said drawings—

Figure 2 is a section through a brooder having the present improvements.

Figure 1:
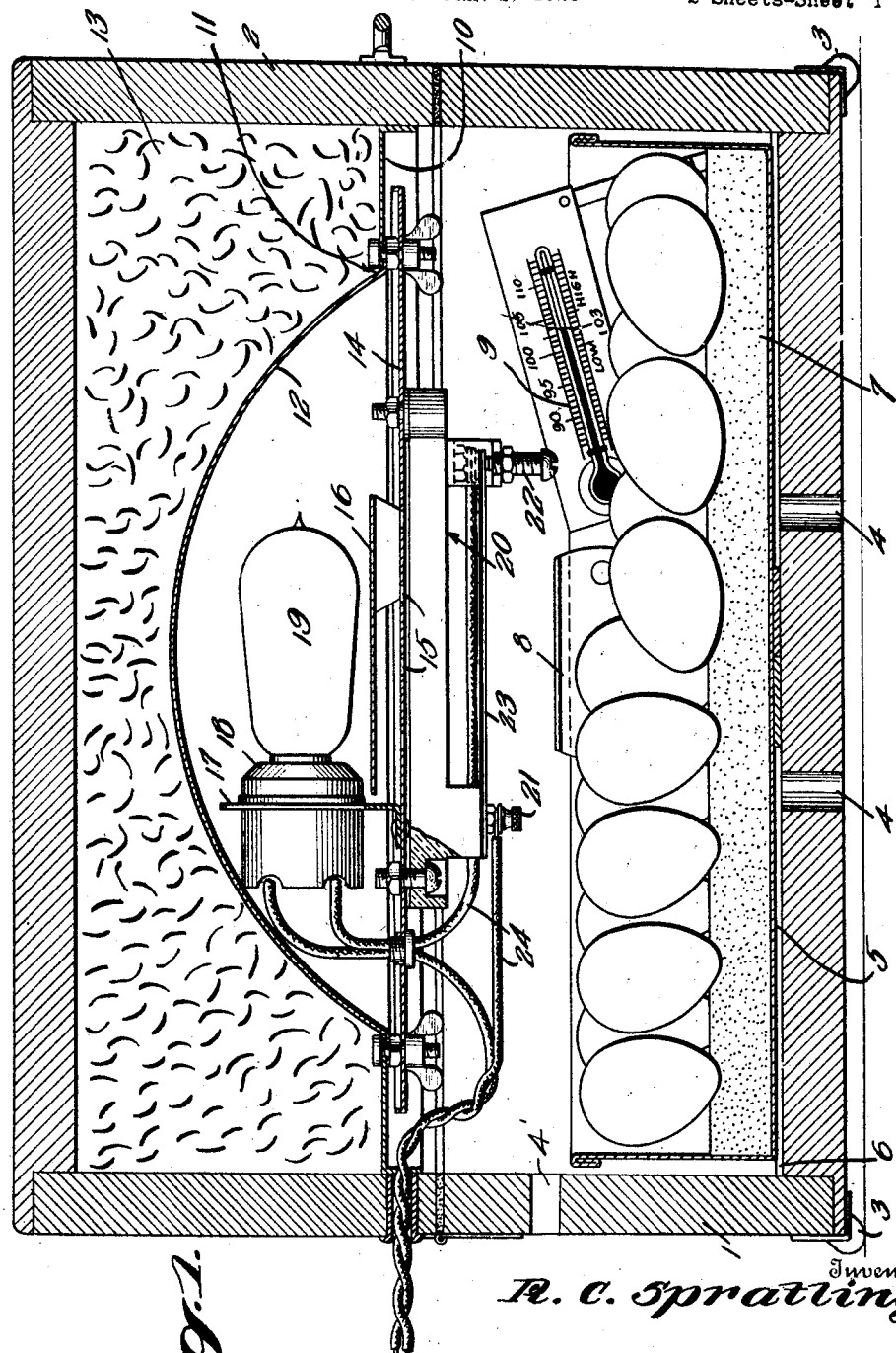
Figure 1 is a section through an incubator having the present improvements combined therewith.

Referring to the figures by characters of reference, 1 designates the bottom section of the housing of the structure and to this structure is hingedly or otherwise connected the top section 2. The two sections normally rest one on top of the other so as to co-operate to form a complete housing and suitable supports 3 serve to hold the bottom of the section 1 off of the structure on which the device rests. Openings 4 are provided in the bottom of section 1 so that fresh air is free to enter the structure below a pan 5 supported on cleats 6 within the section 1. The walls of the pan are spaced from the walls of section 1 and the pan is provided with a layer of clean, white sand 7. A handle 8 is shown at one end of the pan. Two of these handles may be provided to facilitate raising and lowering the pan in the section 1. A thermometer is also located in the pan, as shown at 9.

Secured in the lower portion of the upper section 2 is a plate 10 having a large opening 11 in which is secured a dome-like reflector 12. Suitable insulating material 13 is packed within section 2 above plate 10 and reflector 12.

A cover plate 14 is supported below plate 10 and is spaced therefrom, this cover plate extending past the margin of the reflector 12, thus to conceal the reflector. Openings 15 are provided in the cover plate and supported over these openings is a shield plate 16 parallel with plate 14. A bracket 17 is mounted on the cover plate and supports the socket 18 of an incandescent lamp 19.

An insulation block 20 is secured to and supported under the cover plate 14 and is provided with a binding post 21 and a contact 22. One end of a thermostat strip 23 preferably formed of laminated metals having different coefficients of expansion, is secured to the binding post 21, and the other end of the strip 23 normally engages with the contact 22. Both the contact and the binding post are electrically connected with the lamp socket by conductors 24 and when the strip 23 is in normal position a circuit is thus established through the lamp from a source of current, not shown.

In using the structure as an incubator eggs are placed on the sand 7, as shown and the section 2 is lowered to closed position. When the lamp 19 is energized the heat and light rays will flow to the cover plate 14 and those rays which are dissipated from the lamp away from the plate will be reflected back to the plate. Thus the heat will be spread throughout the width and length of the structure and fresh air entering the openings 4 will rise within the section 1 and be thoroughly heated. The walls of the pan 5 will prevent the cool fresh air from coming into contact with the eggs because the walls are extended above the eggs. When the temperature begins to rise above the desired degree, the thermostat strip 23 will curl out of engagement with contact 23 and the circuit to the lamp will thus be broken and the generation of heat stopped. It will be understood that the fresh cool air rising within the structure will circulate along, around and through the plate 14 so as to be properly heated before coming into contact with the eggs. The opening or lifting of the top of the structure at intervals during the first fourteen days of incubation will allow the used air to escape from the structure and be displaced by fresh air entering the openings 4. After the fourteen day period mentioned the top 2 can be slightly lifted to provide an outlet for air or, if desired, openings can be provided in the walls of the structure at points above the top of the pan for the outflow of the air. Such openings have been indicated at 4' in Fig. 1.

Sufficient humidity can be supplied to the eggs by placing moisture in the sand 7.

In the construction of a brooder, as shown in Figure 2, the upper section 25 is fitted snugly to the lower section 26, and this upper section has a dome-like reflector 27 above which is a suitable insulating material 28. A dished cover plate 29 is supported from the reflector and is adapted to hang within the lower section 26. This cover plate has openings 30 over which is supported a shield plate 31. A bracket 32 supports a lamp socket 33 below the reflector plate 27 and a lamp 34 is carried by the socket. Obviously the heat of the lamp will be directed both directly and by reflection toward the cover plate which, in turn, will distribute the heat throughout the width and length of the brooder. The shield plate 31, as well as the plate 16 in Figure 1, will prevent the light and heat rays from passing directly from the lamp to the eggs or to the chicks in the structure. Any suitable arrangement of cloths may be provided in addition to the structures shown for the purpose of better hovering the chicks.

What is claimed is:—

1. In a structure of the class described, the combination with upper and lower sections movably connected, of a reflector carried by the upper section, insulation interposed between the reflector and the upper section, a cover plate under and spaced from the reflector, a heater interposed between the reflector and the cover plate, an egg holding pan below the cover plate, and means for directing fresh air through the bottom of the structure and around the pan to the heater.

2. In a structure of the class described, the combination with movably connected upper and lower sections, and a heating means within the upper section, of a pan supported in the lower section and spaced from the bottom and walls thereof, a layer of granular egg-supporting means in the pan, and means for directing fresh air through the bottom of the structure and under the pan, said pan constituting means for spreading the air to the walls of the structure and delivering it into the structure above the level of the supported eggs.

3. In a structure of the class described the combination with upper and lower sections movably connected, of a dome-like heat and light reflector supported within the upper section and spaced from the top thereof, insulating material interposed between the top of the upper section and the reflector, a cover plate connected to the marginal portion of the reflector and having openings therein for the circulation of air, a shield plate interposed between the reflector and the cover plate and extending over but spaced from the openings, an electric lamp mounted in the space between the reflector and the shield plate, said shield plate constituting means for preventing the direct passage of light rays from the lamp to the opening.

In testimony that I claim the foregoing as my own, I have hereto affixed my signature in the presence of two witnesses.

ROPER C. SPRATLING.

Witnesses:
V. M. Ross,
DINA FLOSI.